(12) United States Patent
Chou et al.

(10) Patent No.: US 7,436,837 B2
(45) Date of Patent: Oct. 14, 2008

(54) PACKET FORWARDING DEVICE AND METHOD

(75) Inventors: Yu-Zuong Chou, Taipei (TW); James Lin, Dali (TW); Chih-Ching Wang, Wufong Township, Taichung County (TW); Chun-Feng Liu, Taipei (TW); Jin-Ru Chen, Taichung (TW)

(73) Assignee: Realtek Semiconductor Corp., Hsinchu (TW)

( * ) Notice: Subject to any disclaimer, the term of this patent is extended or adjusted under 35 U.S.C. 154(b) by 693 days.

(21) Appl. No.: 10/958,041

(22) Filed: Oct. 4, 2004

(65) Prior Publication Data
US 2005/0086395 A1 Apr. 21, 2005

(30) Foreign Application Priority Data
Oct. 3, 2003 (TW) ............................. 92127361 A

(51) Int. Cl.
*H04L 12/28* (2006.01)

(52) U.S. Cl. ..................................... 370/392; 370/400

(58) Field of Classification Search .................. None
See application file for complete search history.

(56) References Cited

U.S. PATENT DOCUMENTS

| | | | |
|---|---|---|---|
| 6,771,673 B1* | 8/2004 | Baum et al. ................. | 370/535 |
| 2002/0071386 A1* | 6/2002 | Gronke ....................... | 370/217 |
| 2003/0218978 A1* | 11/2003 | Brown ........................ | 370/230 |

* cited by examiner

*Primary Examiner*—Edan Orgad
*Assistant Examiner*—Jung Park
(74) *Attorney, Agent, or Firm*—Thomas, Kayden, Horstemeyer & Risley

(57) ABSTRACT

The packet forwarding device and method of the invention assign a virtual port number to each peripheral interface. The device and method can recognize and process the packets coming from or transferred to the virtual port according to the packet direct forward function of the forward device. Thus, the device and method can process the packets that are inputted to or outputted from the peripheral interface and the network device connected to the peripheral interface in a manner similar to the typical method for processing the packets that are only inputted to or outputted from the physical port.

12 Claims, 4 Drawing Sheets

PACKET FORWARDING DEVICE AND METHOD

This application claims the benefit of Taiwan application Serial No. 092127361, filed Oct. 3, 2003, the subject matter of which is incorporated herein by reference.

BACKGROUND OF THE INVENTION

1. Field of the Invention

The invention relates in general to a communication system, and more particularly to packet forwarding device and method using a virtual port.

2. Description of the Related Art

Most of the conventional network switches are the Layer 2 dumb switch, which can only simply forward the packet to the corresponding port of the dumb switch using a Layer-2 forwarding unit according to a target MAC address of the packet. As for Layer 3 or higher function, such as routing, network address translation (NAT) or access control list (ACL), the packet forwarding has to be processed by a CPU so that where the packet should be transferred may be determined. Thus, the CPU spends a lot of time in executing the associated network protocol software. If the higher packet forwarding speed has to be reached, the CPU with the faster processing speed has to be used. However, when a new application appears, the application requirement cannot be satisfied until the upgrade is made. Nevertheless, because the current CPU, the switch controller and other peripheral interfaces have been combined into a single chip system, the replacement of the CPU means that the overall chip has to be replaced and the system has to be redesigned, which spends too much time and cost.

In addition, some conventional switch controllers have incorporated Layer 3 or higher function, and directly perform the packet forwarding function using a Multi-Layer (at least Layer-2 and Layer-3) forwarding unit and substantially without the processing of the CPU. Instead, the CPU only has to process the packet that cannot be processed by the switch controller. As for Layer 3 or higher function, power consumed by the CPU is greatly saved because the CPU does not have to process in most cases and most of the CPU's operational resource can be kept for other functions. On the other hand, because the packet forwarding is directly completed by the Multi-Layer forwarding unit of the switch controller, these functions may be performed at the wirespeed, and the system efficiency may be greatly enhanced.

However, in the switch incorporated with other peripheral interfaces such as PCI, USB, and PCMCIA, the packet outputted from or inputted to the peripheral interfaces has to be processed by the CPU that executes the associated network protocol software. FIG. 1 is a schematic illustration showing an internal packet forwarding procedure of a switch 10. The switch 10 includes a CPU 11, a forwarding unit 12 (which can be a Layer-2 or Multi-Layer forwarding unit) and a peripheral interface 13. As shown in FIG. 1, the CPU 11 executes proper network protocol software as well as the drivers for the forwarding unit 12 and the peripheral interface 13 so as to transfer the packet to peripheral interface 13. The peripheral interface 13 may be connected to the external network device, such as a WLAN network adapter.

As shown in FIG. 1, most of the packets (including Layer 2, Layer 3 or higher) inputted to or outputted from the forwarding unit 12 are directly forwarded through the transfer path 1. Only a few packets (Layer 3 or higher) inputted to or outputted from the forwarding unit 12 are forwarded through the transfer path 2, and are processed by the CPU 11 that executes the associated network protocol software. The CPU 11 includes at least one network protocol software and a driver layer which includes a forwarding unit driver and peripheral driver. All the packets inputted to or outputted from the peripheral interface 13 are forwarded through the transfer path 3 are processed by the CPU 11 that executes the associated network protocol software. Thus, the switch 10 directly and quickly forwards the packets that are only inputted to or outputted from the physical port of the forwarding unit 12. As for the packets that are transferred between the forwarding unit 12 and the peripheral interface 13, the CPU 11 still has to be used to execute the associated network protocol software in order to forward these packets because the peripheral interface 13 is not the physical port of the switch 10. These packets may be regarded as being indirectly forwarded through the associated software. In other words, all the packets that are transferred between the forwarding unit 12 and the peripheral interface 13 still have to be processed by the associated network protocol software, which has to execute all the conventional procedures such as bridging, routing, NAT or filtering according to the properties of the packets. Consequently, the software has to be designed to execute various process methods according to various packets coming from the forwarding unit 12 and the peripheral interface 13, thereby enlarging the program, increasing the setup and management complexities of the software, and further slowing down the system's operation speed.

SUMMARY OF THE INVENTION

In order to increase the speed for forwarding the packet that is outputted from or inputted to the peripheral interface, the invention assigns a virtual port number to each peripheral interface, and then extends the packet forwarding function of the internal forwarding unit of the switch so that the packet outputted from or inputted to the virtual port may be recognized. Consequently, it is possible to process the packet outputted from or inputted to the peripheral interface and thus enhance the system efficiency according to the packet forwarding function of the direct forwarding of the forwarding unit in a typical manner similar to that for processing the packet inputted to or outputted from the physical port of the forwarding unit.

The invention achieves the above-identified object by providing a packet forwarding device, which includes a peripheral interface to be connected to a network device. This forwarding device also includes a forwarding unit coupled to the peripheral interface. The forwarding unit assigns a virtual port to the peripheral interface and includes a forward table, in which at least a corresponding relationship between the virtual port and the network device is recorded, and a target port list is determined according to a content of a received packet and the forward table. If the target port list contains the virtual port, the forwarding unit forwards the packet to the network device through the peripheral interface without the processing of the CPU.

The invention also provides a packet forwarding method comprising the steps of: assigning a virtual port to a peripheral interface, wherein the peripheral interface is coupled to a network device; recording a corresponding relationship between the virtual port and the network device in a forward table; determining a target port list according to a content of a received packet and the forward table; and forwarding the received packet to the network device through the peripheral interface if the target port list contains the virtual port.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 2:
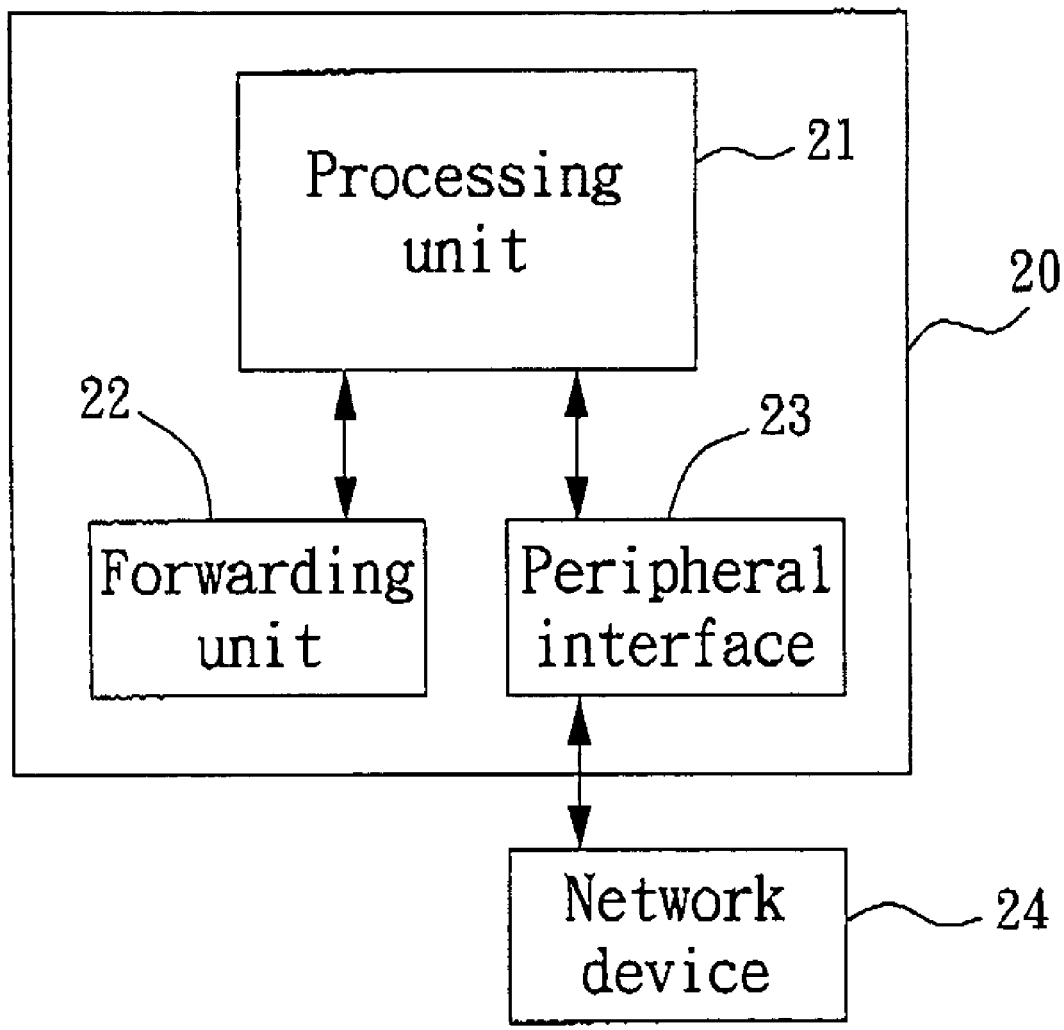
FIG. 2 is a block diagram showing a packet forwarding device according to a preferred embodiment of the invention.

FIG. 2 is a block diagram showing a packet forwarding device according to an embodiment of the invention. Referring to FIG. 2, a packet forwarding device 20 includes a peripheral interface 23, a CPU 21 and a forwarding unit 22 having at least one physical port. The device 20 of the invention can assign a virtual port to the peripheral interface 23. The virtual port can be assigned to the interface by a logic or a driver. Herein, the virtual port is not the above-mentioned physical port, but is a virtual port number. The peripheral interface 23 may be any proper interface, such as the USB interface, the PCI interface or the PCMCIA interface that is often used, which can be coupled to a proper network device 24 according to its property. For example, if the peripheral interface 23 is the PCMCIA interface, it may be coupled to a WLAN network adapter with the PCMCIA specification.

In an embodiment, the forwarding unit 22 includes a forward table, which at least records each port (may contain the physical port and the virtual port) corresponding to a MAC address. The corresponding relationship between the virtual port and the MAC address of the network device 24 coupled to the peripheral interface 23 is recorded in this forward table. The forwarding unit 22 determines a target port list of a received packet according to a content of the received packet and the forward table so as to forward this received packet. The forwarding unit can view the interface as an equivalent of the physical port according to the virtual port such that the forwarding unit is capable of forwarding the received packet without a network protocol software. Or the forwarding unit can forward the received packet to the network device through the interface by referencing the forward table when the content of the received packet indicates a destination to the network device. For example, if the packet is a Layer 2 packet, the forwarding unit 22 directly searches for the forward table to determine the target port list according to the target MAC address of the Layer 2 packet. It is to be noted that the target port list is directly determined by the forwarding unit 22 without the associated network protocol software being executed. Of course, the forwarding unit 22 can be a Layer 2 forwarding unit or a high-Layer forwarding unit.

The packet forwarding device 20 also includes a CPU 21 coupled between the peripheral interface 23 and the forwarding unit 22. The CPU 21 can receive the packet, which cannot be directly forwarding by the forwarding unit 22, from the forwarding unit 22 and execute the associated network protocol software to perform the indirect forwarding procedure when the target port list determined by the forwarding unit 22 is null (i.e., when the forwarding unit 22 cannot directly forward the packet).

In an embodiment, In order to facilitate the forwarding procedure, a control header including a source port field, a target port field, and a done field is used when the packet is transferred between the CPU 21 and the forwarding unit 22. when a port of the device 20 receives a packet, the port of the device 20 is recorded in the source port field of the control header of the packet. If the device 20 receives the packet from the peripheral interface 23, the port number of the virtual port assigned by the CPU 21 is recorded in the source port field of the packet. If the packet is received from the physical port of the forwarding unit 22, the port number of the physical port is recorded in the source port field of the control header. What is recorded in the target port field is the target port list, which includes the port number(s) of the physical port and/or the virtual port and is determined by the forwarding unit 22. In an embodiment, two bits of the target port field are used to represent a physical port and a virtual port, respectively. The done field includes an identification bit for representing whether or not the packet has been processed by the forwarding unit 22 so as to judge how to make the subsequent process when the CPU 21 has received the packet.

Figure 1:
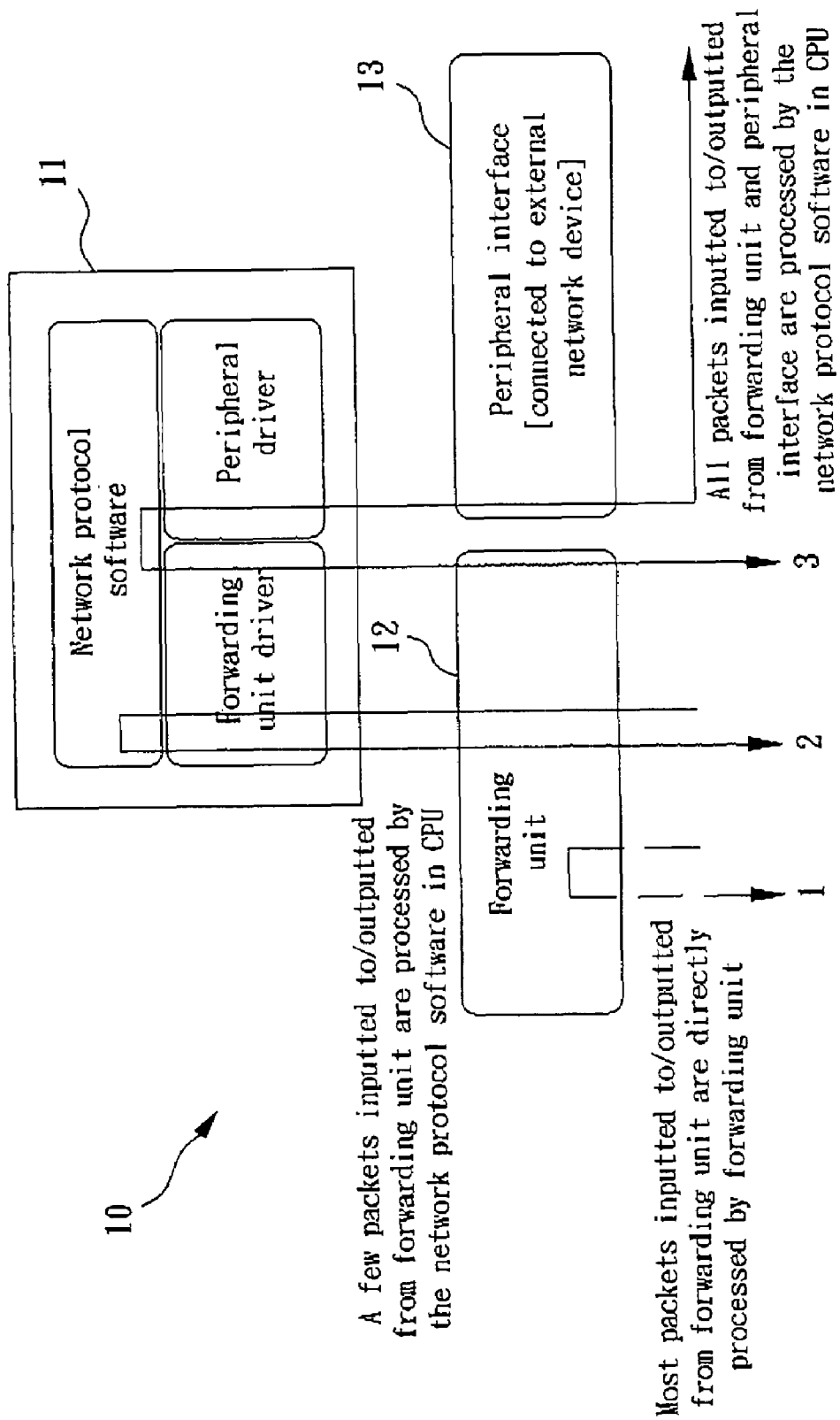
FIG. 1 is a schematic illustration showing an internal packet processing procedure of a switch incorporated with other peripheral devices.
Figure 3:
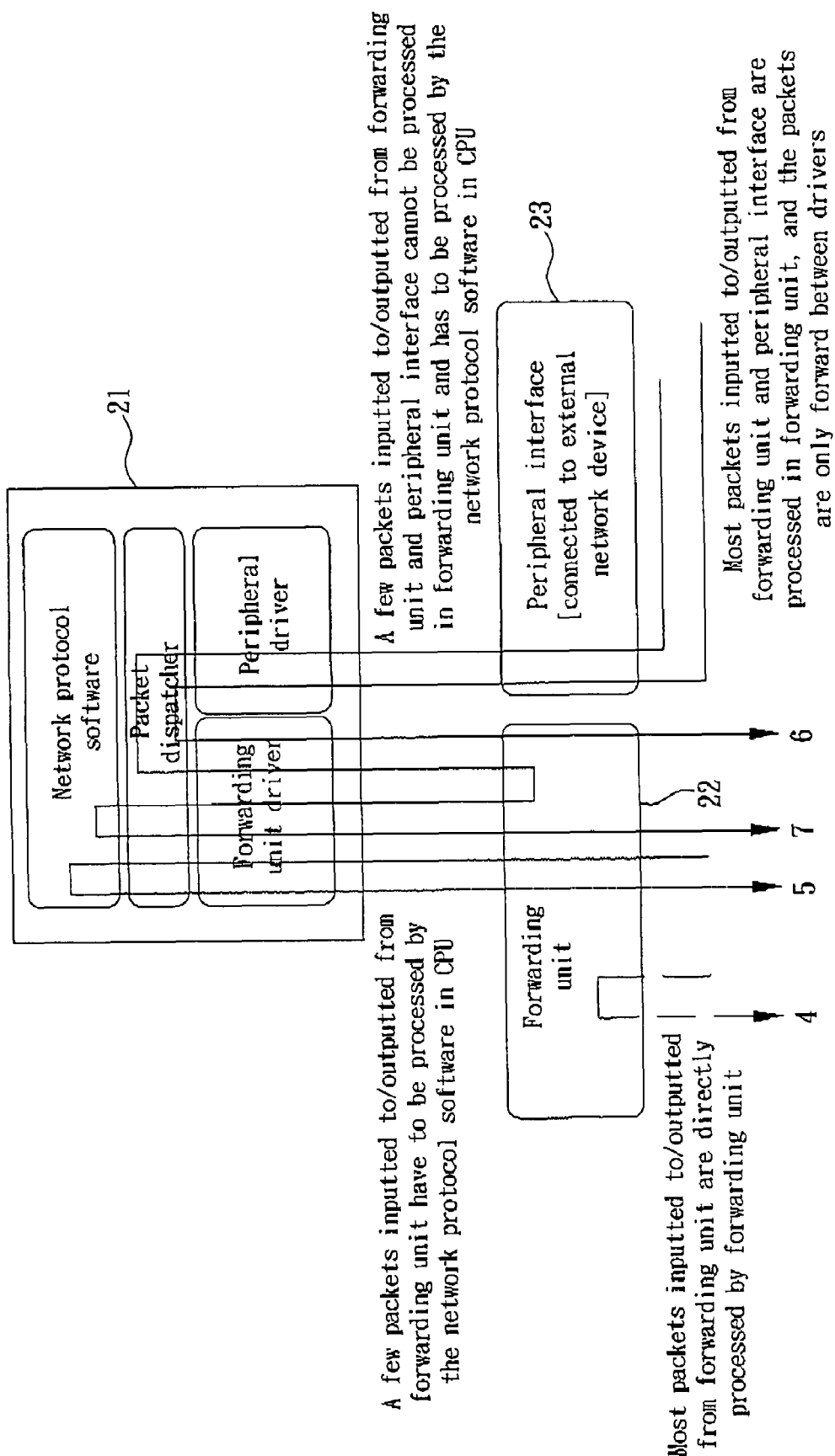
FIG. 3 is a schematic illustration showing an internal packet processing procedure of the packet forwarding device of the invention.

FIG. 3 is a schematic illustration showing an internal packet processing procedure of the packet forwarding device 20 of this invention. Compared to the CPU 11 of FIG. 1, the CPU 21 of FIG. 3 additionally includes a packet dispatcher which is a software code. The packet dispatcher, the forwarding unit driver, and the peripheral driver are in the driver layer when the packet dispatcher of the CPU 210 receiving a packet, the packet dispatcher judges and reads the identification bit in the control header of the packet. If this packet is received from the peripheral interface 23 (as shown in the transfer paths 6 and 7 of FIG. 3), the packet dispatcher first adds the control header to the packet, wherein the source port is the port number of the virtual port, the target port is null, and the identification bit is set to false. Next, when the packet dispatcher has judged that the identification bit is false, it is known that the packet has not been processed by the forwarding unit 22 yet. So, the packet is transferred to the forwarding unit 22 to see whether or not the direct forwarding operation can be performed by the forwarding unit 22. If the forwarding unit can directly forward the packet, the transfer path 6 of FIG. 3 is followed. If the forwarding unit can not directly forward the packet, the transfer path 7 of FIG. 3 is followed.

On the contrary, if the identification bit shows that the packet has been processed by the forwarding unit 22, the target port field thereof is further judged. If the target port field contains the virtual port, the packet dispatcher of the CPU 21 directly transfers the packet to the peripheral interface 23 according to the virtual port without using the associated network protocol software in the CPU 21. If the target port field is null (i.e., the field does not contain any physical port or any virtual port), it means that the packet need be processed by the associated network protocol software in the CPU 21 because the forwarding unit 22 cannot directly forward this packet. Thus, the packet dispatcher transfers the packet to the network protocol software, and then the CPU 21 executes the higher-level network protocol software to processes and indirectly forwards this packet.

On the other hand, after the forwarding unit 22 has received a packet, the forwarding unit 22 always directly determines the target port list of the packet according to the content of the packet and the internal forward table (or other associated tables) regardless of one condition, in which the packet is transferred from the peripheral interface 23 through the packet dispatcher of processing unit 21 (the transfer paths 6 and 7 of FIG. 3), or another condition, in which the packet is received from its own physical port (transfer paths 4 and 5 of FIG. 3). The embodiment of the invention is to utilize the concept of the virtual port to make the packet coming from the peripheral interface 23 have the function of being directly forwarded by the forwarding unit 22 in the hardware manner. Thus, the CPU 21 does not have to execute the associated network protocol software to process the packet from the peripheral interface 23, and the operational resource of the CPU 21 may be saved.

If the forwarding unit 22 determines that the target port list is the physical port of the forwarding unit 22, the forwarding unit 22 directly forwards the packet to the contained physical port and thus complete the direct forwarding operation. If the target port list further contains the virtual port or is null (i.e., contains no virtual port or physical port), the forwarding unit 22 updates the control header of the packet when the packet is transferred from the packet dispatcher of the CPU 21, or adds the control header to the packet when the packet is received from the physical port, wherein the identification bit is set to true, the target port field is the determined target port list, and the source port field is the physical port or virtual port for receiving the packet. Next, the forwarding unit 22 transfers the packet containing the control header to the packet dispatcher of the CPU 21, and the subsequent process is preformed according to the above-discussed portion of the processing unit 21. In an embodiment, the forwarding unit 22 and the corresponding drivers (ex: the packet dispatcher) are integrated in a single chip.

Referring again to FIG. 3, most of the packets (inclusive of Layer 3 or higher-Layer packet), which are inputted to or outputted from the forwarding unit 22 are directly forwarded through the transfer path 4 by the forwarding unit 22. Only a few packets (inclusive of Layer 3 or higher), which are inputted to or outputted from the forwarding unit 22, are forwarded through the transfer path 5 and processed by the associated network protocol software in the CPU 21. Most of the packets, which are inputted to or outputted from the forwarding unit 22 and the peripheral interface 23 are directly forwarded through the transfer path 6. In this case, only the packet dispatcher has to be used to add the control header, and only the driver has to be used to receive and transfer the packet without using the higher network protocol software. Only a few packets, which are inputted to or outputted from the forwarding unit 22 and the peripheral interface 23, are forwarded through the transfer path 7. In this case, the forwarding unit 22 judges that the packets cannot be processed and then transfers the packets to the higher network protocol software of the CPU 21. In the embodiment, the packets are transferred through the transfer paths 4 to 7 under the aid of the control header, and the implementation method has been described herein before.

Figure 4:
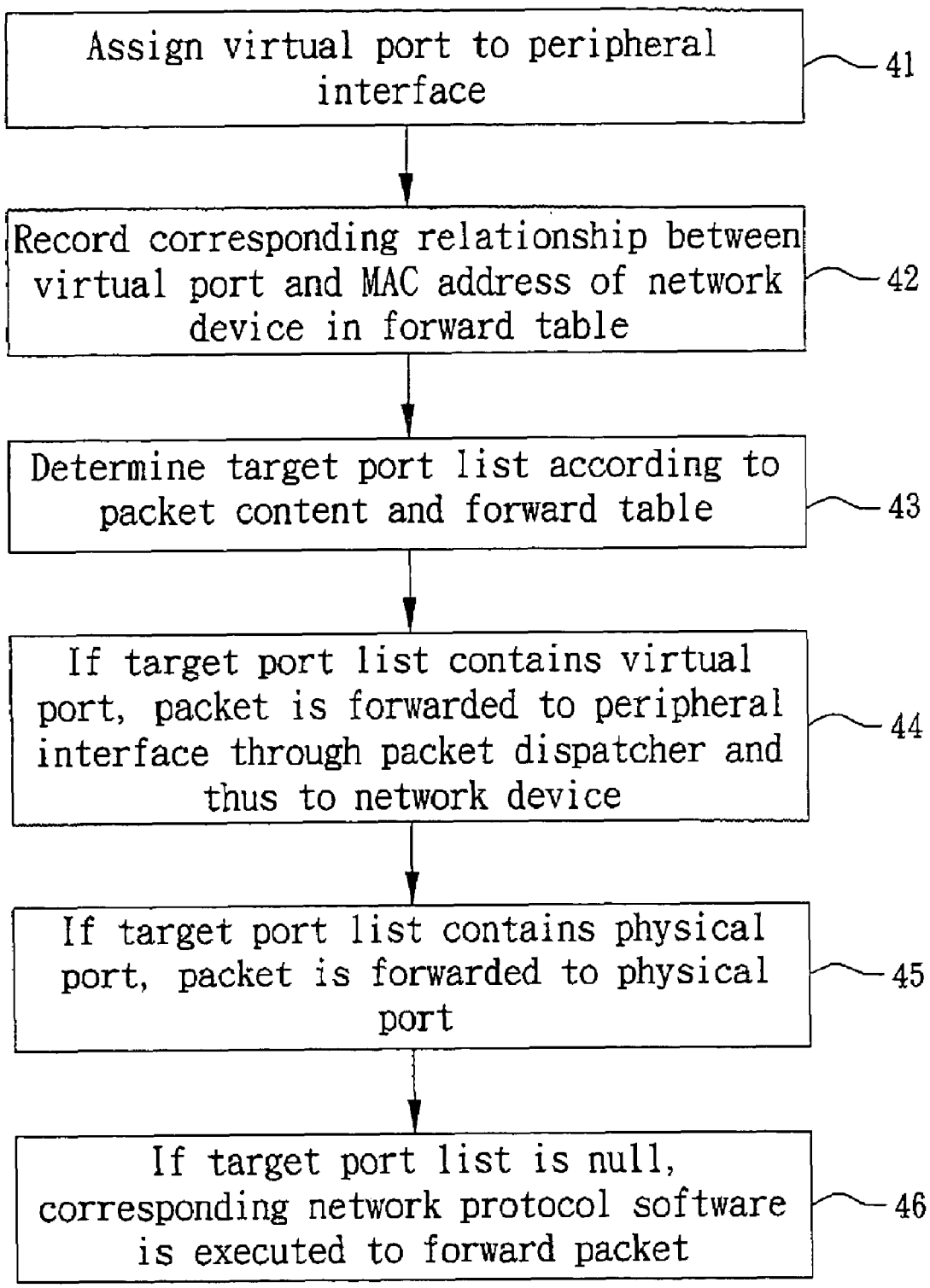
FIG. 4 is a flow chart showing a packet forwarding method according to the preferred embodiment of the invention.

FIG. 4 is a flow chart showing a packet forwarding method according to the embodiment of the invention. As shown in FIG. 4, this method utilizes the packet forwarding device 20 of FIG. 2 to execute the following steps.

In step 41, the CPU 21 assigns a virtual port to the peripheral interface 23.

In step 42, the forwarding unit 22 records the corresponding relationship between the virtual port and the MAC address of the network device 24 in the forward table.

In step 43, the forwarding unit 22 determines a target port list according to a content of a received packet and the forward table. In the embodiment, the target port list of the forwarding unit 22 is determined directly by hardware without the associated network protocol software being executed.

In step 44, if the target port list contains the virtual port, the forwarding unit 22 forwards the packet to the peripheral interface 23 through the packet dispatcher and the packet is then transferred to the network device 24.

In step 45, if the target port list contains a physical port, the forwarding unit 22 forwards the packet to the physical port.

In step 46, if the target port list is null, the packet is forwarded by the higher network protocol software in the CPU 21.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An apparatus for forwarding a received packet, comprising:
    an interface to be coupled to a network device;
    a logic, coupled to the interface, to assign a virtual port to the interface; and
    a forwarding unit, coupled to the logic, comprising at least one physical port and a forward table, in which a relationship between the virtual port and the network device is recorded, the forward unit directly determines a target port list according to a content of the received packet and the forward table and either forwards the received packet to the network device through the interface when the content including at least an address of the received packet is correspond to the virtual port or directly forwards the received packet to a first physical port when the target port list includes the first physical port,
    wherein the logic executes a corresponding network protocol software to forward the received packet only when the target port list does not include the virtual port and the physical port.

2. The apparatus of claim 1, wherein the target port list is determined without a corresponding network protocol software being executed.

3. The apparatus of claim 1, wherein the logic comprises a packet dispatcher for assigning the virtual port to the interface.

4. The apparatus of claim 3, wherein the packet dispatcher is in a driver layer.

5. The apparatus of claim 4, wherein the driver layer further comprises a forwarding unit driver corresponding to the forwarding unit and an interface driver corresponding to the interface.

6. The apparatus of claim 1, wherein the relationship comprises the virtual port and a MAC address of the network device.

7. The apparatus of claim 1, wherein the interface is one of a universal serial bus (USB) interface, a peripheral component interconnect (PCI) interface and a personal computer memory card international association (PCMCIA) interface.

8. The apparatus of claim 1, wherein a control header of the received packet is utilized when the received packet is transferred between the forwarding unit and the logic.

9. A method for forwarding a received packet, comprising:
    assigning a virtual port to a peripheral interface, wherein the peripheral interface is coupled to a network device;
    recording a corresponding relationship between the virtual port and the network device in a forward table;
    determining a target port list according to a content of the received packet and the forward table;
    forwarding the received packet to or from the network device through the peripheral interface when the content including at least an address of the received packet is corresponding to the virtual port;

forwarding the received packet to a physical port when the target port list contains the physical port; and executing a corresponding network protocol software to indirectly forward the received packet when the target port list does not include the virtual port and the physical port.

10. The method of claim 9, wherein the assigning step is executed in a packet dispatcher.

11. The method of claim 10, wherein the packet dispatcher is in a driver layer.

12. The method of claim 9, wherein the corresponding relationship is a relationship between the virtual port and a MAC address of the network device.

* * * * *